United States Patent
Churan

(10) Patent No.: US 7,453,920 B2
(45) Date of Patent: Nov. 18, 2008

(54) CODE SYNCHRONIZATION IN CDMA SATELLITE WIRELESS COMMUNICATIONS SYSTEM USING UPLINK CHANNEL DETECTION

(75) Inventor: Gary G. Churan, Annandale, VA (US)

(73) Assignee: ATC Technologies, LLC, Reston, VA (US)

( * ) Notice: Subject to any disclaimer, the term of this patent is extended or adjusted under 35 U.S.C. 154(b) by 631 days.

(21) Appl. No.: 11/067,006

(22) Filed: Feb. 25, 2005

(65) Prior Publication Data

US 2005/0201449 A1 Sep. 15, 2005

Related U.S. Application Data

(60) Provisional application No. 60/551,526, filed on Mar. 9, 2004.

(51) Int. Cl.
*H04L 27/30* (2006.01)
(52) U.S. Cl. .................. 375/142; 375/145; 375/149; 375/367; 370/515
(58) Field of Classification Search ................ 375/142, 375/145, 147, 149, 150, 362, 365, 367, 368; 370/503, 509, 512–515
See application file for complete search history.

(56) References Cited

U.S. PATENT DOCUMENTS

| 4,901,307 | A | 2/1990 | Gilhousen et al. |
| 5,073,900 | A | 12/1991 | Mallinckrodt |
| 5,303,286 | A | 4/1994 | Wiedeman |
| 5,339,330 | A | 8/1994 | Mallinckrodt |
| 5,394,561 | A | 2/1995 | Freeburg |
| 5,446,756 | A | 8/1995 | Mallinckrodt |
| 5,448,623 | A | 9/1995 | Wiedeman et al. |
| 5,481,561 | A | 1/1996 | Fang |
| 5,511,233 | A | 4/1996 | Otten |

(Continued)

FOREIGN PATENT DOCUMENTS

EP 0 506 255 A2 9/1992

(Continued)

OTHER PUBLICATIONS

Lim et al. (US 2004/0014452)—Random Access Channel Access Apparatus For Mobile Satellite Communicatin System And Method Therefor.*

(Continued)

*Primary Examiner*—Dac V Ha
(74) *Attorney, Agent, or Firm*—Myers Bigel Sibley & Sajovec PA

(57) ABSTRACT

An uplink signal transmitted by a terminal is received by a satellite wireless communications system. The uplink signal includes a known information element, e.g., a reverse access channel (R-ACH) preamble, spread according to a spreading code specific to a component of a satellite wireless communications system, e.g., a pseudonoise (PN) sequence associated with a satellite beam. A correlation of the received uplink signal with the spreading code over a range of time shifts is determined. The known information element is detected from the determined correlation. The satellite wireless communications system is synchronized with the terminal responsive to detection of the known information element. For example, a delay may be assigned to a receiver of the satellite wireless communications system responsive to detection of the known information element.

24 Claims, 5 Drawing Sheets

U.S. PATENT DOCUMENTS

| | | |
|---|---|---|
| 5,555,257 A | 9/1996 | Dent |
| 5,584,046 A | 12/1996 | Martinez et al. |
| 5,612,703 A | 3/1997 | Mallinckrodt |
| 5,619,525 A | 4/1997 | Wiedeman et al. |
| 5,631,898 A | 5/1997 | Dent |
| 5,642,377 A | 6/1997 | Chung et al. |
| 5,663,734 A | 9/1997 | Krasner |
| 5,696,762 A | 12/1997 | Natali et al. |
| 5,761,605 A | 6/1998 | Tawil et al. |
| 5,765,098 A | 6/1998 | Bella |
| 5,781,543 A | 7/1998 | Ault et al. |
| 5,812,947 A | 9/1998 | Dent |
| 5,828,659 A | 10/1998 | Teder et al. |
| 5,832,379 A | 11/1998 | Mallinckrodt |
| 5,835,857 A | 11/1998 | Otten |
| 5,848,060 A | 12/1998 | Dent |
| 5,852,721 A | 12/1998 | Dillon et al. |
| 5,878,329 A | 3/1999 | Mallinckrodt |
| 5,884,142 A | 3/1999 | Wiedeman et al. |
| 5,907,541 A | 5/1999 | Fairholm et al. |
| 5,926,758 A | 7/1999 | Grybos et al. |
| 5,930,710 A | 7/1999 | Sawyer et al. |
| 5,937,332 A | 8/1999 | Karabinis |
| 5,940,753 A | 8/1999 | Mallinckrodt |
| 5,950,131 A | 9/1999 | Vilmur |
| 5,953,325 A | 9/1999 | Willars |
| 5,991,345 A | 11/1999 | Ramasastry |
| 5,995,832 A | 11/1999 | Mallinckrodt |
| 6,011,951 A | 1/2000 | King et al. |
| 6,023,605 A | 2/2000 | Sasaki et al. |
| 6,052,364 A | 4/2000 | Chalmers et al. |
| 6,052,560 A | 4/2000 | Karabinis |
| 6,052,586 A | 4/2000 | Karabinis |
| 6,055,264 A | 4/2000 | Kenney et al. |
| 6,058,135 A | 5/2000 | Spilker, Jr. |
| 6,067,442 A | 5/2000 | Wiedeman et al. |
| 6,072,430 A | 6/2000 | Wyrwas et al. |
| 6,072,770 A | 6/2000 | Ho et al. |
| 6,081,547 A | 6/2000 | Miya |
| 6,085,094 A | 7/2000 | Vasudevan et al. |
| 6,091,933 A | 7/2000 | Sherman et al. |
| 6,097,752 A | 8/2000 | Wiedeman et al. |
| 6,101,385 A | 8/2000 | Monte et al. |
| 6,108,317 A | 8/2000 | Jones et al. |
| 6,108,561 A | 8/2000 | Mallinckrodt |
| 6,134,260 A | 10/2000 | Bottomley et al. |
| 6,134,437 A | 10/2000 | Karabinis et al. |
| 6,157,811 A | 12/2000 | Dent |
| 6,157,820 A | 12/2000 | Sourour et al. |
| 6,157,834 A | 12/2000 | Helm et al. |
| 6,160,994 A | 12/2000 | Wiedeman |
| 6,163,548 A | 12/2000 | Rainish et al. |
| 6,169,878 B1 | 1/2001 | Tawil et al. |
| 6,198,730 B1 | 3/2001 | Hogberg et al. |
| 6,198,921 B1 | 3/2001 | Youssefzadeh et al. |
| 6,201,967 B1 | 3/2001 | Goerke |
| 6,222,828 B1 | 4/2001 | Ohlson et al. |
| 6,226,282 B1 | 5/2001 | Chung |
| 6,233,463 B1 | 5/2001 | Wiedeman et al. |
| 6,240,124 B1 | 5/2001 | Wiedeman et al. |
| 6,253,080 B1 | 6/2001 | Wiedeman et al. |
| 6,256,497 B1 | 7/2001 | Chambers |
| 6,324,405 B1 | 11/2001 | Young et al. |
| 6,330,271 B1 | 12/2001 | Klang et al. |
| 6,339,707 B1 | 1/2002 | Wainfan et al. |
| 6,370,184 B1 | 4/2002 | Hellberg |
| 6,393,276 B1 | 5/2002 | Vanghi |
| 6,404,758 B1 | 6/2002 | Wang |
| 6,418,147 B1 | 7/2002 | Wiedeman |
| 6,449,461 B1 | 9/2002 | Otten |
| 6,452,913 B1 | 9/2002 | Proctor, Jr. |
| 6,519,237 B1 | 2/2003 | McDonough et al. |
| 6,522,865 B1 | 2/2003 | Otten |
| 6,567,482 B1 * | 5/2003 | Popovic' .................... 375/343 |
| 6,603,735 B1 | 8/2003 | Park et al. |
| 6,625,200 B1 | 9/2003 | Dent |
| 6,628,919 B1 | 9/2003 | Curello et al. |
| 6,665,288 B1 | 12/2003 | Ottosson et al. |
| 6,684,057 B2 | 1/2004 | Karabinis |
| 6,735,437 B2 | 5/2004 | Mayfield et al. |
| 6,775,251 B1 | 8/2004 | Wiedeman |
| 6,785,543 B2 | 8/2004 | Karabinis |
| 6,856,787 B2 | 2/2005 | Karabinis |
| 6,859,652 B2 | 2/2005 | Karabinis et al. |
| 6,879,829 B2 | 4/2005 | Dutta et al. |
| 6,892,068 B2 | 5/2005 | Karabinis et al. |
| 6,937,857 B2 | 8/2005 | Karabinis |
| 6,975,837 B1 | 12/2005 | Santoru |
| 6,999,720 B2 | 2/2006 | Karabinis |
| 7,006,789 B2 | 2/2006 | Karabinis et al. |
| 7,046,717 B2 * | 5/2006 | Kanterakis et al. .......... 375/141 |
| 2001/0017852 A1 | 8/2001 | Skoog et al. |
| 2002/0009126 A1 | 1/2002 | Mehrnia et al. |
| 2002/0012363 A1 | 1/2002 | Beidas et al. |
| 2002/0122408 A1 | 9/2002 | Mullins |
| 2002/0123352 A1 | 9/2002 | Vayanos et al. |
| 2002/0141356 A1 | 10/2002 | Beidas et al. |
| 2002/0146979 A1 | 10/2002 | Regulinski et al. |
| 2002/0177465 A1 | 11/2002 | Robinett |
| 2003/0003815 A1 | 1/2003 | Yamada |
| 2003/0022625 A1 | 1/2003 | Otten et al. |
| 2003/0054762 A1 | 3/2003 | Karabinis |
| 2003/0054814 A1 | 3/2003 | Karabinis et al. |
| 2003/0054815 A1 | 3/2003 | Karabinis |
| 2003/0068978 A1 | 4/2003 | Karabinis et al. |
| 2003/0073436 A1 | 4/2003 | Karabinis et al. |
| 2003/0149986 A1 | 8/2003 | Mayfield et al. |
| 2003/0153308 A1 | 8/2003 | Karabinis |
| 2003/0161543 A1 | 8/2003 | Tanaka |
| 2004/0072539 A1 | 4/2004 | Monte et al. |
| 2004/0102156 A1 | 5/2004 | Loner |
| 2004/0121727 A1 | 6/2004 | Karabinis |
| 2004/0142660 A1 | 7/2004 | Churan |
| 2004/0192200 A1 | 9/2004 | Karabinis |
| 2004/0192293 A1 | 9/2004 | Karabinis |
| 2004/0192395 A1 | 9/2004 | Karabinis |
| 2004/0203393 A1 | 10/2004 | Chen |
| 2004/0203742 A1 | 10/2004 | Karabinis |
| 2004/0240525 A1 | 12/2004 | Karabinis et al. |
| 2005/0026606 A1 | 2/2005 | Karabinis |
| 2005/0037749 A1 | 2/2005 | Karabinis et al. |
| 2005/0041619 A1 | 2/2005 | Karabinis et al. |
| 2005/0064813 A1 | 3/2005 | Karabinis |
| 2005/0079816 A1 | 4/2005 | Singh et al. |
| 2005/0090256 A1 | 4/2005 | Dutta |
| 2005/0118948 A1 | 6/2005 | Karabinis et al. |
| 2005/0136836 A1 | 6/2005 | Karabinis et al. |
| 2005/0164700 A1 | 7/2005 | Karabinis |
| 2005/0164701 A1 | 7/2005 | Karabinis et al. |
| 2005/0170834 A1 | 8/2005 | Dutta et al. |
| 2005/0181786 A1 | 8/2005 | Karabinis et al. |
| 2005/0201449 A1 | 9/2005 | Churan |
| 2005/0208890 A1 | 9/2005 | Karabinis |
| 2005/0221757 A1 | 10/2005 | Karabinis |
| 2005/0227618 A1 | 10/2005 | Karabinis et al. |
| 2005/0239399 A1 | 10/2005 | Karabinis |
| 2005/0239403 A1 | 10/2005 | Karabinis |
| 2005/0239404 A1 | 10/2005 | Karabinis |
| 2005/0239457 A1 | 10/2005 | Levin et al. |
| 2005/0245192 A1 | 11/2005 | Karabinis |
| 2005/0260947 A1 | 11/2005 | Karabinis et al. |
| 2005/0260984 A1 | 11/2005 | Karabinis |
| 2005/0265273 A1 | 12/2005 | Karabinis et al. |
| 2005/0272369 A1 | 12/2005 | Karabinis et al. |

| | | | |
|---|---|---|---|
| 2005/0282542 | A1 | 12/2005 | Karabinis |
| 2005/0288011 | A1 | 12/2005 | Dutta |
| 2006/0040659 | A1 | 2/2006 | Karabinis |

FOREIGN PATENT DOCUMENTS

| | | |
|---|---|---|
| EP | 0 597 225 A1 | 5/1994 |
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 1 059 826 A1 | 12/2000 |
| EP | 1 094 619 | 4/2001 |
| EP | 1 193 989 A1 | 4/2002 |
| EP | 1 261 144 | 11/2002 |
| GB | 2 361 152 | 10/2001 |
| WO | WO 94/30024 | 12/1994 |
| WO | WO 98/59512 | 12/1998 |
| WO | WO 99/46866 | 9/1999 |
| WO | WO 99/63677 | 12/1999 |
| WO | WO 00/36760 | 6/2000 |
| WO | WO 01/54314 A1 | 7/2001 |
| WO | WO 01/65713 | 9/2001 |
| WO | WO 02/03556 | 1/2002 |
| WO | WO 02/45290 | 6/2002 |
| WO | WO 02/098009 | 12/2002 |
| WO | WO 03/044985 | 5/2003 |
| WO | WO 03/096570 | 11/2003 |
| WO | WO 03/103326 | 12/2003 |
| WO | WO 04/002022 A1 | 12/2003 |

OTHER PUBLICATIONS

Lim et al. (US 2004/0014452)—Random Access Channel Access Apparatus For Mobile Satellite Communicatin System And Method Therefor, Jan. 22, 2004.*

Gerakoulis et al., "Network Access and Synchronization Procedures for a CDMA Satellite Communication System," IEEE Military Communications Conference Proceedings, Atlantic City, NJ, Oct. 31-Nov. 3, 1999, pp. 413-417.

Notification of Transmittal of the International Search Report and the Written Opinion of the International Searching Authority, PCT/US2005/007483, Jun. 10, 2005.

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

Ayyagari et al., "A satellite-augmented cellular network concept", *Wireless Networks*, Vo. 4, 1998, pp. 189-198.

* cited by examiner

CODE SYNCHRONIZATION IN CDMA SATELLITE WIRELESS COMMUNICATIONS SYSTEM USING UPLINK CHANNEL DETECTION

RELATED APPLICATION

The present application claims priority from U.S. Provisional Application Ser. No. 60/551,526, entitled CDMA Code Synchronization Over Satellite Return Path, filed Mar. 9, 2004 and incorporated herein by reference in its entirety.

FIELD OF THE INVENTION

This invention relates to wireless communications systems and methods, and more particularly to satellite wireless communications systems and methods.

BACKGROUND OF THE INVENTION

CDMA cellular systems (such as IS-95 and CDMA2000 systems) typically require relatively precise timing between a base station and a mobile terminal (MT) to maintain proper synchronization. The MT downloads system timing information from the base transceiver station (BTS), and uses this to set the timing offset of its internal spreading code generators. At the BTS, the RAKE receiver adjusts its internally generated pseudonoise (PN) code offset to match that of the MT. Since terrestrial cells are typically about 1 km in radius, the path delay uncertainty between the MT and BTS typically requires a search range of a few chip periods for the gateway receiver to precisely synchronize to the MT's spreading code.

Compared to the terrestrial environment, CDMA operation using a satellite may introduce a much longer path delay, and also a much greater delay variability due to the larger spot beam coverage areas. For example, beam sizes typical of geosynchronous mobile communications satellites may produce a round-trip delay dispersion on the order of 5 msec within beams located over the northern continental United States (CONUS). Given a CDMA chip period of 0.814 msec, this may require the gateway receiver (or other portion of the satellite system that processes signals from MTs) to search over more than ±3000 chips to synchronize, which may be beyond the capability of conventional receivers.

SUMMARY OF THE INVENTION

In some embodiments of the present invention, methods of synchronizing a satellite wireless communications system with a terminal are provided. An uplink signal transmitted by the terminal is received, the uplink signal including a known information element, e.g., a reverse access channel (R-ACH) preamble, spread according to a spreading code specific to a component of a satellite wireless communications system, e.g., a pseudonoise (PN) sequence associated with a satellite beam. A correlation of the received uplink signal with the spreading code over a range of time shifts is determined. The known information element is detected from the determined correlation. The satellite wireless communications system is synchronized with the terminal responsive to detection of the known information element. For example, a delay may be assigned to a RAKE or other type CDMA receiver used in the satellite wireless communications system responsive to detection of the known information element.

In some embodiments, determining a correlation of the received uplink signal with the spreading code over a range of time shifts may include generating respective sets of correlation measures for respective ones of a plurality of time segments, the sets of correlation measures including respective correlation measures for respective time shifts of the range of time shift, and averaging the correlation measures for the respective time shifts over the plurality of sets of correlation measures to generate a set of average correlation measures. Detecting the known information element from the determined correlation may include detecting a peak value in the set of average correlation measures. Generating respective sets of correlation measures for respective ones of a plurality of time segments may include correlating respective sets of samples of the received uplink signal for the respective time segments with multiple time shifts of the spreading code to generate respective sets of correlation values (e.g., using a fast Fourier transform (FFT) correlator), and generating respective sets of magnitude measures for the respective time segments from the respective sets of correlation values. Averaging the correlation measures for the respective time shifts over the plurality of sets of correlation measures may include averaging the magnitude measures for the respective time shifts over the sets of magnitude measures to generate the set of average correlation measures.

In further embodiments of the present invention, a radio signal is received at a satellite wireless communications system. A preamble of a transmitted R-ACH message in the received radio signal is detected. The satellite wireless communications system is synchronized with a terminal that transmitted the R-ACH message responsive to detection of the preamble of the R-ACH message. Detection of the preamble of the transmitted R-ACH message may include determining a correlation of the received radio signal with a reference PN sequence and detecting the preamble of a transmitted R-ACH message from the determined correlation.

According to additional embodiments of the present invention, an apparatus is provided for synchronizing a satellite wireless communications system with a terminal that transmits an uplink signal including a known information element spread according to a spreading code specific to a component of a satellite wireless communications system. The apparatus includes a receiver configured to receive the uplink signal transmitted by the terminal, to determine a correlation of the received uplink signal with the spreading code over a range of time shifts, to detect the known information element from the determined correlation and to synchronize with the terminal responsive to detection of the known information element. In yet further embodiments, an apparatus for synchronizing a satellite wireless communications system with a terminal includes a receiver configured to receive a radio signal at the satellite wireless communications system, to detect a preamble of a R-ACH message transmitted by a terminal and to synchronize with the terminal responsive to detection of the preamble of the R-ACH message.

In further embodiments, a satellite wireless communications system includes a satellite configured to receive an uplink signal from a terminal, the uplink signal including a known information element spread according to a spreading code specific to a component of a satellite wireless communications system. The system further includes means for determining a correlation of the received uplink signal with the spreading code over a range of time shifts, means for detecting the known information element from the determined correlation and means for synchronizing with the terminal responsive to detection of the known information element. In additional embodiments, a satellite wireless communications system includes a satellite configured to receive radio signal from a terminal, means for detecting a preamble of a R-ACH message transmitted by a terminal from the radio signal, and means for synchronizing with the terminal responsive to detection of the preamble of the R-ACH message.

DETAILED DESCRIPTION

Figure 1:
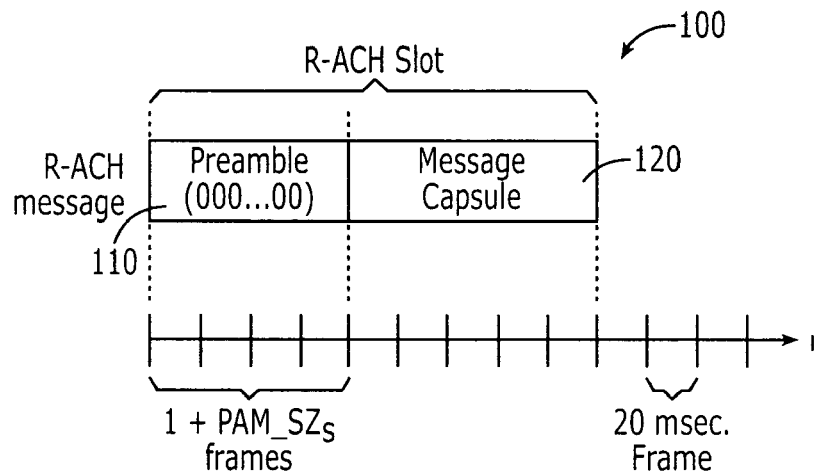
FIG. 1 illustrates a format of a conventional random access channel (R-ACH) message.

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, a "wireless terminal" includes cellular and/or satellite communications devices with or without a multi-line display; Personal Communications System (PCS) terminals that may combine a voice and data processing, facsimile and/or data communications capabilities; Personal Digital Assistants (PDA) that can include a radio frequency transceiver and a pager, Internet/Intranet access, Web browser, organizer, calendar and/or a global positioning system (GPS) receiver; and/or conventional laptop and/or palmtop computers or other appliances, which include a radio frequency transceiver. As used herein, "wireless terminal" also includes "mobile terminals" that may be portable, transportable, installed in a vehicle (aeronautical, maritime, or land-based), or situated and/or configured to operate locally and/or in a distributed fashion at any other location(s) on earth and/or in space, as well as terminals designed for operation from a fixed location.

According to some exemplary embodiments of the invention, rapid code synchronization over a wide range of satellite path delays may be provided by searching for a unique information element in a spread-spectrum satellite uplink signal. For example, the known information element may include a PN-sequence transmitted during the preamble of an MT's Reverse Access Channel (R-ACH) transmission. Exemplary embodiments using detection of a PN-sequence in R-ACH transmission of a MT communicating according to IS-95 or CDMA2000 protocols will now be described, but those skilled in the art will appreciate that techniques described herein may be extended to other transmission formats within the scope of the present invention.

The structure of an MT's exemplary R-ACH transmission 100 compliant with IS-95 and CDMA2000 protocols is shown in FIG. 1. It includes an access channel preamble 110 of all-zero bits followed by a message capsule 120 transmitted at an information rate of 4800 bps. For example, the length of the preamble 110 may be an integer number equal to (1+PAM_SZs) 20-msec. frames, where the parameter PAM_SZs is downloaded to the MT from the BTS, and is therefore network-configurable.

The preamble and message capsule bits in FIG. 1 may be processed through a series of encoding and interleaving steps that increase the raw symbol rate to, in the instant example, 307.2 ksps, followed by spreading code modulation that produces the final chip rate of 1.2288 Mcps. However, during preamble transmission, the symbol stream input to the spreader is all zeros, so the process flow may be simplified to the block diagram shown in FIG. 2.

Figure 2:
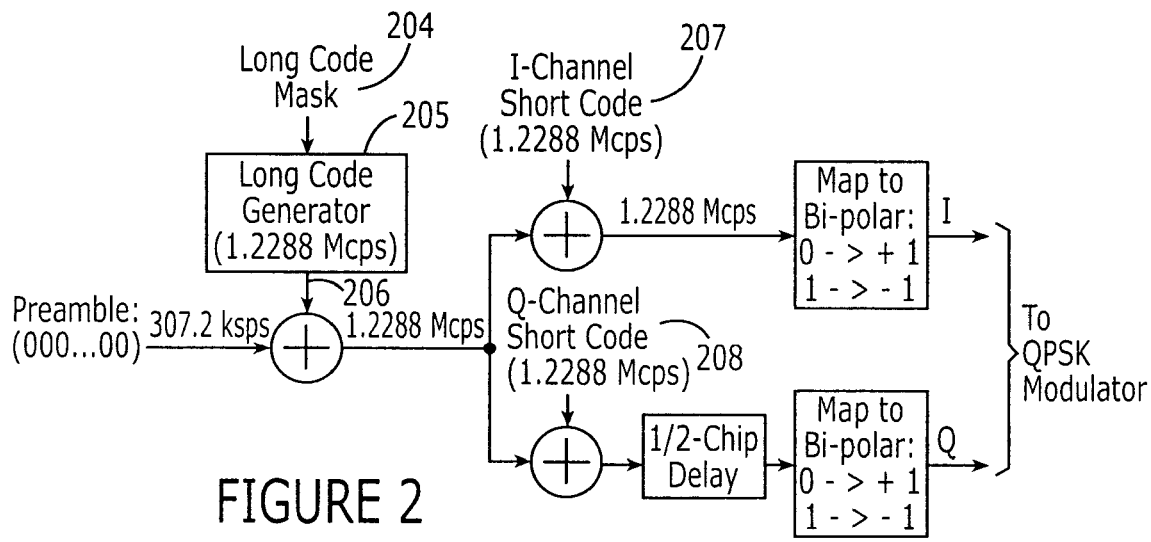
FIG. 2 is a schematic diagram illustrating exemplary spread-spectrum encoding in a conventional wireless communications system.

A Long Code 206 produced by a Long Code generator 205 in FIG. 2 is a PN-sequence of length $2^{42}-1 (\approx 2.4 \times 10^{12})$ bits. For the R-ACH, a Long Code mask 204 used to set the timing offset of the Long Code generator 205 is calculated as a function of BTS-related parameters only, so all MTs use the same Long Code mask 204 for a given R-ACH. A Short Code PN-sequence of 32768 chips overlays the Long Code-modulation but does not produce any additional signal spreading. Different Short Code sequences 207, 208 modulate I- and Q-channels. For all MT transmissions in the instant example, the Short Code offset index is set to zero. The offset indices for the Long and Short Codes 104, 207, 208 are defined with respect to the MT's internal system time, which for satellite operation is delayed from true system time by the amount of the satellite path delay (e.g., around 250 msec.). After Short Code modulation, the resulting signals are mapped to bipolar values (+1) for QPSK modulation.

From FIG. 2, it can be seen that the PN-sequence transmitted during the R-ACH preamble is the modulo-2 sum of the Long and Short Codes (in FIG. 2, the "+" symbols indicate modulo-2 addition). The PN-timing offset observed at the gateway is a function of the MT's PN-generator offset indices (which may be known to the network) plus the unknown path delay between the gateway and the MT. By detecting the R-ACH message preamble at the gateway and measuring the timing offset of its spreading code, the path delay to the transmitting MT can be precisely determined.

In some embodiments of the invention, detecting a R-ACH transmission preamble at a satellite gateway (e.g., via a bent-pipe path through a satellite) involves performing a correlation of the received CDMA signals against a range of R-ACH spreading code timing offsets that could be received from MTs located anywhere within the given spot beam coverage. If each R-ACH uses its own unique Long Code mask, separate correlators may be required for each R-ACH. One possible implementation is described below with reference to FIGS. 3 and 4.

Figure 3:
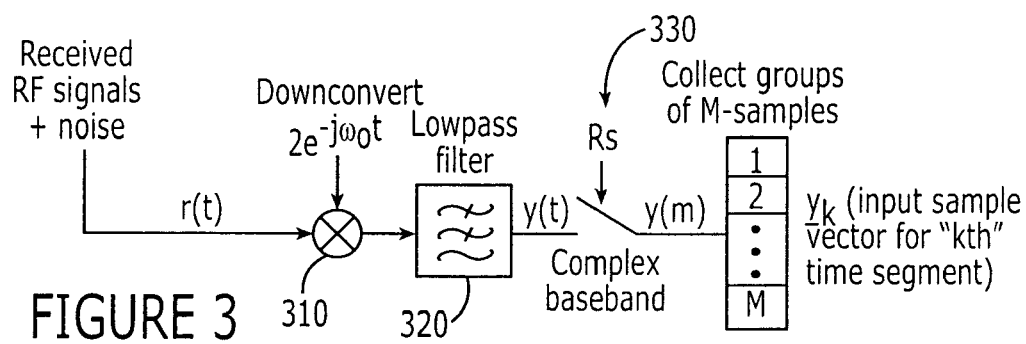
FIG. 3 is a schematic diagram illustrating generation of vectors of radio signal samples according to some embodiments of the present invention.

Referring to FIG. 3, the received CDMA signals plus channel noise are down-converted by the nominal carrier frequency coo to complex baseband by a downconverter 310. The I- and Q-components thus produced are then low-pass filtered in a filter 320 to remove image frequency components, yielding a complex baseband input signal y(t). The signal y(t) is then sampled by a sampler 330 at approximately the chipping rate to form a discrete complex sequence y(m). Groups of M complex samples of y(m) may be collected to form time segment vectors $v_k$, where index "k" denotes the "kth" time segment.

The number of samples M in the vector $v_k$ may be limited by the maximum Doppler shift of the received MT signals. Any difference between the down-conversion frequency coo and the MT's actual received carrier frequency may produce a phase rotation across the complex samples of $v_k$. When the total phase rotation over the time segment exceeds π radians, the correlation peak should begin to diminish, and at 2π, the peak should disappear. Thus, it may be advantageous to limit the time segment duration to approximately one-half period of the maximum Doppler shift frequency. For a land-mobile case at L-band transmission frequencies, the maximum Doppler shift due to vehicle motion for the instant example may be about 350 Hz, assuming that the MT's local oscillator is locked to the forward carrier, and that the Doppler component due to satellite motion is negligible. Therefore, the time duration of each $v_k$ may be limited in this exemplary case to a maximum of about 1.4 msec. At a sampling rate of 1.2288 MHz, this may constrain the maximum value of M to about 1700 time samples.

Figure 4:
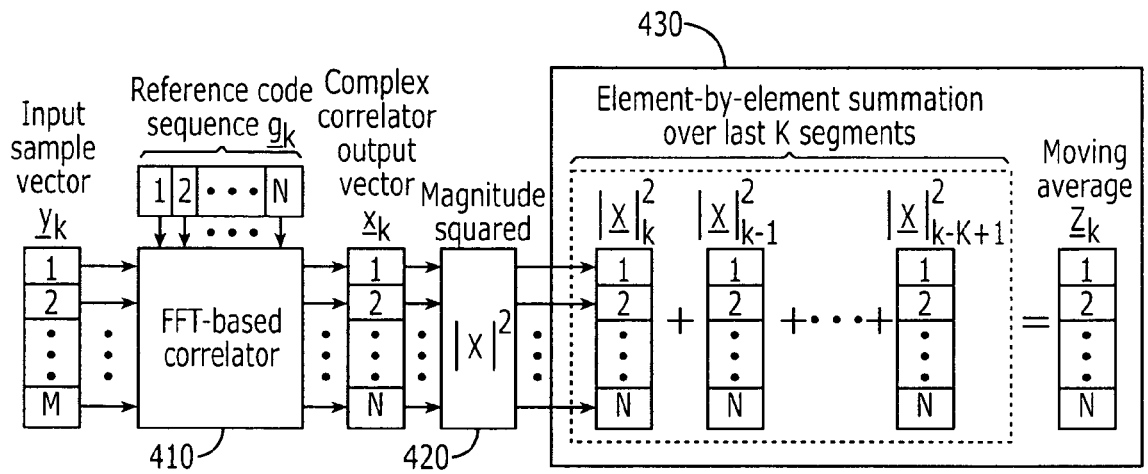
FIG. 4 is a schematic diagram illustrating generation of correlation measures according to further embodiments of the present invention.

In FIG. 4, each sample segment $v_k$ is correlated with internally generated complex reference sequence $g_k$. A fast Fourier transform (FFT) correlator 410 may be used to maximize computational efficiency. This FFT can use the correspondence between multiplication in the frequency domain and convolution in the time domain to produce a very computationally efficient correlation in some embodiments. The real and imaginary parts of the $g_k$ elements correspond to the complex conjugate of the I- and Q-channel PN-sequences transmitted by the MT during the R-ACH preamble, so both I- and Q-channels can be processed simultaneously. While such an FFT-based correlator may be preferred, it will be appreciated that other correlators and/or correlation techniques may be used with the present invention.

For each time segment k, the reference sequence $g_k$ may be advanced so that the midway point of the sequence matches the PN-timing offset that would be received from a MT transmitting at the center of the beam footprint. The reference sequence $g_k$ preferably spans the full range of possible delay offsets plus the duration of the input segment $v_k$. For the instant example, this requires a total time span of about 6.5 msec., and a total number of samples N equal to about 8000 (sampling at the chipping rate). Setting N=8192 provides a convenient correlator implementation using an 8192-point FFT.

The FFT-correlation process produces an output vector $x_k$ whose elements $x_k(n)(1 \leq n \leq N)$ correspond to the cross-correlation of input vector $v_k$ with the "nth" circular shift of the reference vector $g_k$. The complex elements $x_k(n)$ are converted to magnitude-squared values in a magnitude-squared converter 420 to combine the I- and Q-terms. The resulting values are then summed element-by-element over the "K" most recent time segments in a moving averager 430 to produce the vector $z_k$. The presence of a R-ACH preamble should produce a correlation peak at the element $z_k(n)$ whose index n matches the PN-timing offset of the received R-ACH preamble. Concurrent R-ACH transmissions should produce multiple peaks, each corresponding to its own timing offset. Since the true correlation peaks should occur at the same offset in each successive $|x|^2_k$ segment, but false peaks due to noise should change randomly from segment to segment, the moving average process shown in FIG. 4 can enhance the ratio of true-peak to false-peaks in $z_k$.

As shown in FIG. 4, each element in $z_k$ includes K elements from the prior $|x|^2_k$ segments as follows:

$$z_k(n) = \sum_{j=k-K+1}^{k} |x_j(n)|^2$$

Figure 5:
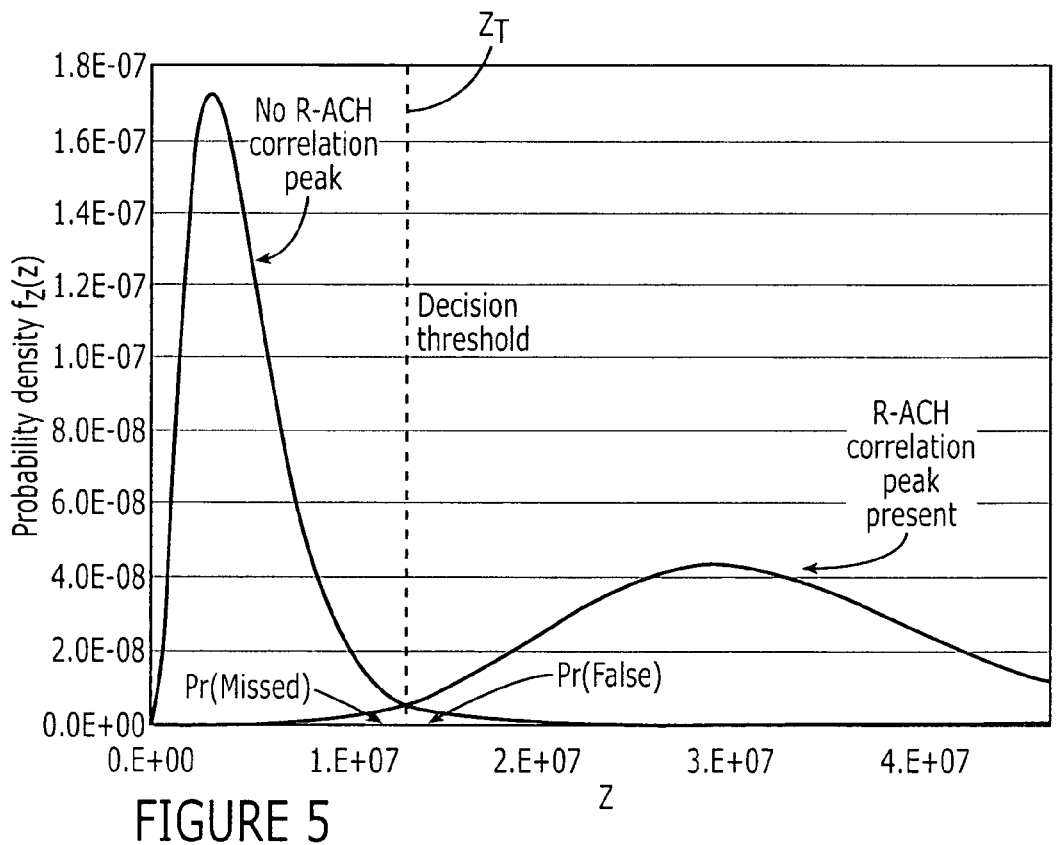
FIG. 5 is a graph illustrating probabilities of missed and false detection of a R-ACH preamble according to some embodiments of the present invention.

FIG. 5 illustrates two possible probability distribution outcomes for $z_k(n)$. In the absence of a R-ACH correlation peak, the $x_j(n)$ terms are uncorrelated zero-mean random variables, so the sum of squared magnitudes comprising $z_k(n)$ produces a chi-squared probability distribution with 2K degrees of freedom (where the factor of 2 comes from the contribution of both real and imaginary parts of $x_j(n)$). If a R-ACH correlation peak occurs at the given offset index "n", then the $x_j(n)$ terms are no longer zero-mean (but they are still uncorrelated), and the probability distribution of $z_k(n)$ becomes a non-central chi-squared distribution.

Figure 6:
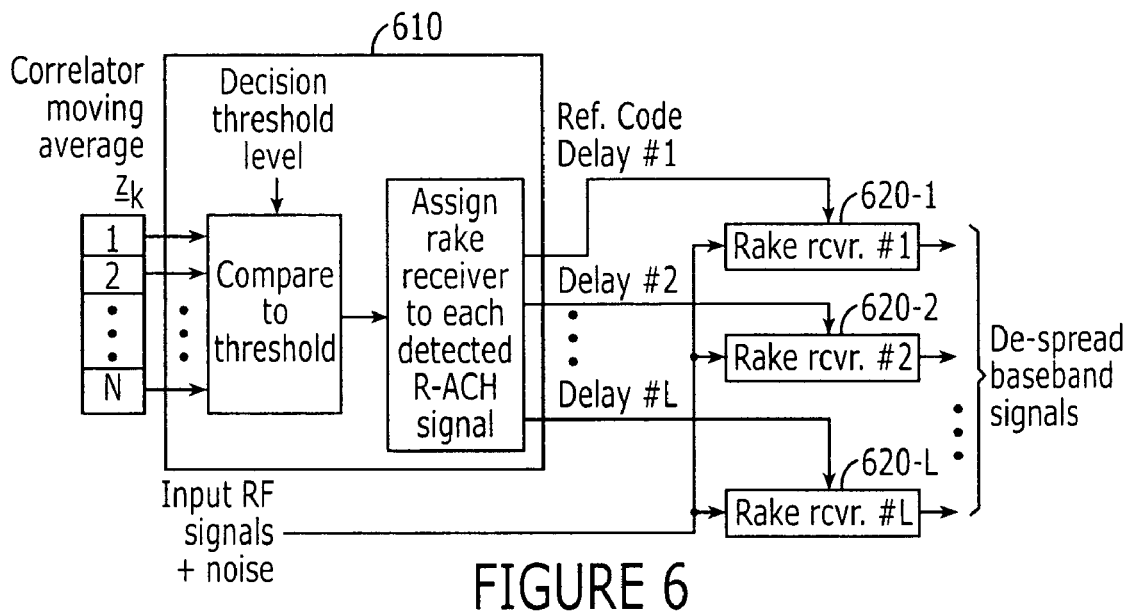
FIG. 6 is a schematic diagram illustrating detection of a R-ACH preamble and control of a RAKE receiver according to some embodiments of the present invention.

As shown in FIG. 5, a decision threshold $z_T$ may be established to provide a desired compromise between missed-detection and false-detection errors. In FIG. 6, such a decision threshold may be applied to each element $z_k(n)$ of a vector $z_k$ in a decision unit 610. If the R-ACH preamble is detected by the presence of a correlation peak, the decision unit 610 assigns one of a plurality of RAKE receivers 620-1, 620-2, ..., 620L to that MT's transmission. The index of the correlation peak is used to compute the satellite path delay, which is applied to offset the RAKE receiver's internal PN generator. This can reduce the receiver's search process to a very small number of chip periods around this initial offset. Once code synchronization is achieved, the RAKE receiver may de-spread and demodulate the MT's R-ACH message in a conventional manner. Several RAKE receivers can be assigned to the same R-ACH, because delay dispersion within the satellite beam footprint may allow multiple MTs to transmit simultaneously on the same R-ACH without causing collisions. As a call progresses from set-up to the in-call phase, the path delay PN offset calculated for the MT's R-ACH transmission may be applied to facilitate synchronization to the MT's reverse traffic channel. In this way, the system can compensate for the satellite path delay over the full call duration. It will be appreciated that although the receivers 620-1, 620-2, . . . , 620L are indicated as being RAKE receivers, i.e., receivers capable of processing multiple delay paths, other types of CDMA receivers may be used with the present invention. For example, a single path demodulator may be used in applications that typically have less severe multipath fading, such as satellite applications.

A probability analysis that indicates how rapidly the correlation method described above can reliably detect a R-ACH preamble according to some embodiments of the invention will now be described. It will be understood that this analysis provides a theoretical explanation pointing to potential advantages of some embodiments of the present invention, and does not limit the present invention to the mathematical models and/or assumptions described in the analysis.

Probability Analysis of an Exemplary R-ACH Preamble Detection Method

Some simplifying assumptions for an analytical model may include:

1. Sampling rate=chip rate (1.2288 MHz);
2. Optimum sampling=No intersymbol interference (ISI);
3. Co-frequency CDMA interference modeled as additive white Gaussian noise (AWGN);
4. No received Doppler shift of desired MT signal;
5. Noise+interference assumed statistically independent between time samples; and
6. MT's transmission is modeled as quaternary phase shift keying (QPSK).

Referring to FIG. 3, define the received RF signal plus noise r(t) as:

$$r(t)=s(t)+w(t) \quad (1)$$

where s(t)=desired CDMA R-ACH preamble signal.

w(t)=aggregate CDMA self-interference plus channel noise, modeled as AWGN.

The desired signal s(t) may be modeled as:

$$s(t)=s_I(t)\cos(\omega_0 t+\theta)+s_Q(t)\sin(\omega_0 t+\theta) \quad (2)$$

where:

$s_I(t)$=I-channel PN spreading modulation ($\pm 1$);

$s_Q(t)$=Q-channel PN spreading modulation ($\pm 1$);

$\theta$=arbitrary received phase angle (constant); and $\omega_0$=received carrier frequency.

PN-sequences $s_I(t)$ and $s_Q(t)$ may be modeled as zero-mean random processes with variance=1.

Letting C represent the power in s(t), it follows from equation (2) that:

$$C = \lim_{T \to \infty} \frac{1}{T} \int_0^T s^2(t)dt = 1. \quad (3)$$

Using quadrature noise representation for the aggregate interference and thermal noise term w(t):

$$w(t)=w_c(t)\cos(\omega_0 t)+w_s(t)\sin(\omega_0 t) \quad (4)$$

where $w_c(t)$ and $w_s(t)$ are statistically independent normal random processes with mean $\mu=0$ and variance $\sigma_w^2$. Letting I represent the time average power of w(t), then:

$$\sigma_w^2 = I \quad (5)$$

Forming the product $2r(t)e^{j\omega_0 t}$ (complex down-conversion), low-pass filtering to remove double-frequency terms, and sampling at the chip rate produces a discrete-time complex baseband sequence y(m). It can be shown that the expression for y(m) is given by:

$$y(m)=e^{j\theta}[s_I(m)-js_Q(m)]+w_c(m)-jw_s(m), \quad (6)$$

where $s_I(m)$, $s_Q(m)$, $w_c(m)$, and $w_s(m)$ are modeled as statistically independent zero-mean random variables having variances 1, 1, I, and I, respectively.

Sequence y(m) may be divided into time segments, each containing M samples, where vector $v_k$ represents the "kth" segment, containing samples y(kM) through y([k+1]M−1).

Referring to FIG. 4, letting g(n) denote the receiver's internal reference sequence, defined as the complex conjugate of the R-ACH PN-sequence that would be received from a MT transmitting from the middle of the beam footprint, yields:

$$g(m)=i(m)+jq(m) \quad (7)$$

where:

i(m)=I-channel reference PN-sequence ($\pm 1$), synchronized to beam mid-point; and q(m)=Q-channel reference PN-sequence ($\pm 1$), synchronized to beam mid-point.

For each input segment $v_k$, a reference code vector $g_k$ may be generated having N=2D+M elements, where $\pm D$ is the maximum code search offset relative to the beam mid-point.

Defining $x_k(n)$ as the correlation of input vector $v_k$ with an offset version of $g_k$ that is time-shifted by n samples yields:

$$x_k(n) = \sum_{m=kM}^{(k+1)M-1} y(m)g(n+m) \quad (8)$$

In evaluating (8), two cases may be considered as follows.

Case 1: Offset Index n is Aligned with Received R-ACH Preamble PN-offset

In this case, the reference sequence g(n+m) is aligned with the received R-ACH preamble PN-sequences $s_I(m)$ and $s_Q(m)$ in $v_k$, such that:

$$i(n+m)=s_I(m) \quad (9)$$

$$q(n+m)=s_Q(m) \quad (10)$$

Substituting equations (6) and (7) into equation (8), with $s_I(m)$ and $s_Q(m)$ replacing i(n+m) and q(n+m), yields:

$$x_k(n) = \sum_{m=kM}^{(k+1)M-1} \{e^{j\theta}[s_I(m)-js_Q(m)]+w_c(m)-jw_s(m)\}[s_I(m)+js_Q(m)]. \quad (11)$$

Multiplying out the factors in equation (11) and simplifying yields:

$$x_k(n) = 2Me^{j\theta} + \sum_{m=kM}^{(k+1)M-1} s_I(m)w_c(m) - \qquad (12)$$

$$js_Q(m)w_c(m) - js_I(m)w_s(m) - s_Q(m)w_s(m).$$

Collecting the real and imaginary terms in equation (12) together yields:

$$x_k(n) = w''_{k\,\mathrm{Re}}(n) + jw''_{k\,\mathrm{Im}}(n), \text{ where:} \qquad (13)$$

$$w''_{k\,\mathrm{Re}}(n) = 2M\cos\theta + \sum_{m=kM}^{(k+1)M-1} s_I(m)w_c(m) - s_Q(m)w_s(m), \text{ and} \qquad (14)$$

$$w''_{k\,\mathrm{Im}}(n) = 2M\sin\theta + \sum_{m=kM}^{(k+1)M-1} s_Q(m)w_c(m) + s_I(m)w_s(m). \qquad (15)$$

It may be recalled that $w_c(m)$ and $w_s(m)$ are zero-mean normal random variables having variance I, and are statistically independent for all values of "m," and that $s_I(m)$ and $s_Q(m)$ are independent zero-mean random variables that take on values of ±1. Then, it follows from equations (14) and (15) that $w''_{k\,Re}(n)$ and $w''_{k\,Im}(n)$ are also normal random variables having the following properties:

$$w''_{k\,Re}(n) \sim \mathcal{N}(\mu=2M\cos\theta, \sigma^2=2MI); \text{ and} \qquad (16)$$

$$w''_{k\,Im}(n) \sim \mathcal{N}(\mu=2M\sin\theta, \sigma^2=2MI). \qquad (17)$$

Case 2: Offset Index n is Not Aligned with Received R-ACH Preamble PN-offset:

In this case, the reference sequences $i(n+m)$ and $q(n+m)$ are uncorrelated with received PN-sequences $s_I(m)$ and $s_Q(m)$. Consequently, the analysis can be simplified by approximating both signal and noise terms in y(m) by an equivalent AWGN process as follows:

$$y(m) \approx w_c'(m) - jw_s'(m), \qquad (18)$$

where:

$$w_c'(m) = s_I(m) + w_c(m); \text{ and} \qquad (19)$$

$$w_s'(m) = s_Q(m) + w_s(m) \qquad (20)$$

In a CDMA channel, the received power of the noise+self-interference terms, represented by $w_c(m)$ and $w_s(m)$, is typically much greater than the desired signal power, represented by $s_I(m)$ and $s_Q(m)$. Thus, the summations in equations (19) and (20) may still be approximately Gaussian. Therefore, $w_c'(m)$ and $w_s'(m)$ can be modeled as normal random variables, having variances equal to the sum of the component variances:

$$w_c'(m) \sim \mathcal{N}(\mu=0, \sigma^2=I+1); \text{ and} \qquad (21)$$

$$w_s'(m) \sim \mathcal{N}(\mu=0, \sigma^2=I+1). \qquad (22)$$

Substituting equations (18) and (7) into equation (8) yields:

$$x_k(n) = \sum_{m=kM}^{(k+1)M-1} [w_c'(m) - jw_s'(m)][i(n+m) + jq(n+m)] \qquad (23)$$

As with Case 1, the product terms in equation (23) can be collected into a single real and imaginary terms as follows:

$$x_k(n) = w'_{k\,\mathrm{Re}}(n) + jw'_{k\,\mathrm{Im}}(n) \qquad (24)$$

where:

$$w'_{k\,\mathrm{Re}}(n) = \sum_{m=kM}^{(k+1)M-1} w_c'(m)i(n+m) + w_s'(m)q(n+m); \text{ and} \qquad (25)$$

$$w'_{k\,\mathrm{Im}}(n) = \sum_{m=kM}^{(k+1)M-1} w_c'(m)q(n+m) - w_s'(m)i(n+m). \qquad (26)$$

Using similar arguments to those for Case #1, $w'_{k\,Re}(n)$ and $w'_{k\,Im}(n)$ can be modeled as normal random variables having the following properties:

$$w'_{k\,Re}(n) \sim \mathcal{N}(\mu=0, \sigma^2=2M[I+1]); \text{ and} \qquad (27)$$

$$w'_{k\,Im}(n) \sim \mathcal{N}(\mu=0, \sigma^2=2M[I+1]) \qquad (28)$$

Having derived expressions for $x_k(n)$ in (13) and (24) corresponding to Case #1 and Case #2, respectively, these complex terms can be converted to magnitude-squared values, and then summed over the prior K time segments to produce:

$$z_k(n) = \sum_{j=k-K+1}^{k} |x_j(n)|^2, \qquad (29)$$

where:

$$|x_j(n)|^2 = x_j(n)x_j(n)^* \qquad (30)$$

The two possible outcomes can be treated separately, as follows.

Case 1: Offset Index "n" Aligned with Received R-ACH Preamble PN-offset

For this case, equation (13) provides an applicable expression for $x_k(n)$. Then:

$$|x_j(n)|^2 = w''_{j\,Re}{}^2(n) + w''_{j\,Im}{}^2(n) \qquad (31)$$

For the derivation that follows, the random variables $w''_{j\,Re}(n)$ and $w''_{j\,Im}(n)$ are treated as being statistically independent. This may be the case between different time segments j, but may not be rigorously correct within the same time segment. This is because both $w''_{j\,Re}(n)$ and $w''_{j\,Im}(n)$ share the same component terms, but multiplied in different combinations as shown in equations (14) and (15). However, since there are a large number of product terms comprising $w''_{j\,Re}(n)$ and $w''_{j\,Im}(n)$, and these product terms are uniquely different between the two random variables, it is expected that $w''_{j\,Re}(n)$ and $w''_{j\,Im}(n)$ will appear uncorrelated, so that the independence assumption appears reasonable.

Substituting equation (31) into equation (29) yields:

$$z_k(n) = \sum_{j=k-K+1}^{k} [w''_{j\,Re}{}^2(n) + w''_{j\,Im}{}^2(n)]. \tag{32}$$

Assuming statistical independence of the $w''_{j\,Re}(n)$ and $w''_{j\,Im}(n)$ terms, then the sum-of-squares in equation (32) produces a non-central chi-squared probability distribution with 2K degrees-of-freedom. The distribution is "non-central" because the component $w''_{j\,Re}(n)$ and $w_j\Delta_{Im}(n)$ terms are not zero-mean, as shown in equations (16) and (17). The "non-centrality parameter" $\lambda$ for this distribution is defined as:

$$\lambda = \sum_{i=1}^{2K} \frac{\mu_i^2}{\sigma^2}, \tag{33}$$

where $\mu_i$ and $\sigma^2$ are the mean and variance of the ith random variable term ($w''_{j\,Re}(n)$ or $w''_{j\,Im}(n)$), respectively. From equations (16) and (17) we have:

$\mu_i = 2M\cos\theta$ for $w''_{j\,Re}(n)$ terms, $= 2M\sin\theta$ for $w''_{j\,Im}(n)$ terms, and \hfill (34)

$\sigma^2 = 2MI$ for both $w''_{j\,Re}(n)$ and $w''_{j\,Im}(n)$ terms. \hfill (35)

Substituting equations (34) and (35) into equation (33) and simplifying yields:

$\lambda = 2KM/I$ \hfill (36)

Then the conditional probability density function of $z_k(n)$ given that the received R-ACH preamble is aligned with offset index n, is given by the following expression for a non-central chi-squared distribution with 2K degrees of freedom:

$$f_z\langle z\,|\,\text{aligned}\rangle = \frac{e^{-(z/\sigma^2 + \lambda)/2}(z/\sigma^2)^{(K-\frac{1}{2})}(\sqrt{\lambda})\,I_{K-1}(\sqrt{\lambda z/\sigma^2})}{2\sigma^2(\lambda z/\sigma^2)^{\frac{K}{2}}}, \tag{37}$$

where $\lambda$ and $\sigma^2$ are given in equations (36) and (35) respectively, and $I_n(x)$ is the modified Bessel function of the first kind.

Case 2: Offset Index in Not Aligned Wraith Received R-ACH PN-offset

In this case, equation (24) provides an applicable expression for $x_k(n)$, and:

$|x_j(n)|^2 = w'_{j\,Re}{}^2(n) + w'_{j\,Im}{}^2(n)$. \hfill (38)

Substituting equation (38) into equation (29) yields:

$$z_k(n) = \sum_{j=k-K+1}^{k} [w'_{j\,Re}{}^2(n) + w'_{j\,Im}{}^2(n)]. \tag{39}$$

As in Case 1, it may be assumed that random variables $w'_{j\,Re}(n)$ and $w'_{j\,Im}(n)$ are mutually independent, and independent across all time segments j. From equations (27) and (28), both $w'_{j\,Re}(n)$ and $w'_{j\,Im}(n)$ are zero-mean normal random variables with variance:

$\sigma^2 = 2M(I+1)$ \hfill (40)

Because the random variables $w'_{j\,Re}(n)$ and $w'_{j\,Im}(n)$ are zero-mean, the sum-of-squares in equation (39) produces a (central) chi-squared probability distribution with 2K degrees of freedom. Thus, the conditional probability density function of $z_k(n)$, given that the received R-ACH preamble is not aligned with offset index n, may be given by the following expression for a chi-squared distribution:

$$f_z\langle z\,|\,\text{not aligned}\rangle = \frac{e^{-(z/2\sigma^2)}(z/\sigma^2)^{(K-1)}}{2^K\sigma^2(K-1)!U(z)}, \tag{41}$$

where the value for $\sigma^2$ is given by equation (40). A cumulative distribution function for $z_k(n)$ can also be expressed in closed-form as follows:

$$F_z\langle z\,|\,\text{not aligned}\rangle = 1 - e^{-(z/2\sigma^2)}\sum_{k=0}^{K-1}(z/2\sigma^2)^k/k!. \tag{42}$$

A decision threshold for all $z_k(n)$, denoted $z_T$, may be established. If $z_k(n) > z_T$, a R-ACH preamble aligned with offset index n may be declared to be present. As illustrated in FIG. 5, a value of $z_T$ may be chosen to provide a desirable compromise between missed-detection and false-detection errors:

$$Pr\{\text{Missed}\} = \int_0^{z_T} f_z\langle z\,|\,\text{aligned}\rangle dz, \text{ and} \tag{43}$$

$$Pr\{\text{False}\} = 1 - F_z\langle z_T\,|\,\text{not aligned}\rangle, \tag{44}$$

where $f_z(z|\text{aligned})$ and $F_z(z|\text{not aligned})$ are given in equations (37) and (42), respectively. The integration in (43) may be performed by means of numerical integration of equation (37).

The definitions of Pr{Missed} and Pr{False} above pertain to a single $z_k(n)$ sample. However, for the instant example, because there may be over 6000 possible offsets n to be evaluated and, typically, at most a few R-ACH preambles being transmitted at any given time, then there are far more opportunities for Pr{False} to occur than for Pr{Missed} to occur. Consequently, it may be more useful to define a new false-detection probability, denoted $\mathcal{P}\{\text{False}\}$, as the conditional probability that one or more $z_k(n)$ samples, over the entire range of (N−M) valid offset values of n, exceeds the threshold $z_T$, given that no R-ACH preamble is present. Then $\mathcal{P}\{\text{False}\}$ is related to Pr{False} for a single $z_k(n)$ sample by:

$\mathcal{P}\{\text{False}\} = 1 - [1 - Pr\{\text{False}\}]^{(N-M)}$. \hfill (45)

For this analysis, the decision threshold $z_T$ was determined iteratively by simultaneously minimizing Pr{Missed} in equation (43) and $\mathcal{P}\{\text{False}\}$ in equation (45).

Using the probability expressions derived above, a calculation of Pr{Missed} and $\mathcal{P}\{\text{False}\}$ versus number of summed time segments K was performed using values of M=1500 and N=8192. The total interference+noise power I was calculated as the sum of channel thermal noise, intra-beam self-interference, and adjacent-beam interference values, shown in Table 1:

TABLE 1

| Return Link Interference Component: | Ebi/I0 (info. rate = 4800 bps) – dB | C/I (channel noise BW = 1.25 MHz) – dB | Interference Power "I" (linear units, relative to C = 1) |
|---|---|---|---|
| Intra-beam self-interference: | 9.0 | −15.2 | 32.8 |
| Adjacent beam interference: | 11.3 | −12.9 | 19.3 |
| Channel thermal noise: | 2.0 | −22.2 | 164.3 |
| Total interference + thermal noise power I: | | | 216.4 |

Figure 7:
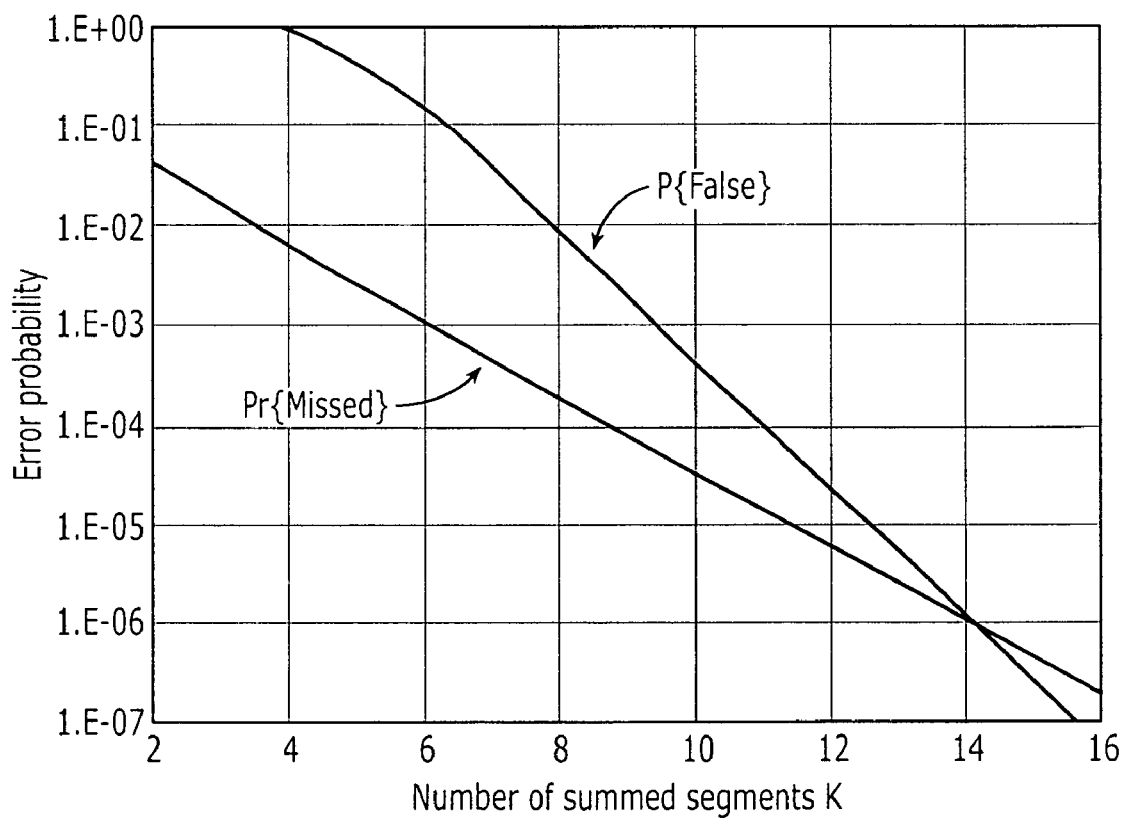
FIG. 7 is a graph illustrating error probabilities as a function of number of correlated time segments according to further embodiments of the present invention.

Using M=1500, N=8192, and I=216.4 as inputs, the calculated values of Pr{Missed} and $\mathscr{P}$ {False} are plotted as functions of K in FIG. 7.

Table 2 summarizes the major parameter values used in the analytical model:

TABLE 2

| Parameter | Value |
|---|---|
| Num. Input Samples "M" per Time Segment $y_k$ (see FIG. 3): | 1500 |
| Duration of Input Time Segment $y_k$: | 1.2 msec. |
| Num. Samples "N" per Reference PN-Segment $g_k$ (see FIG. 4): | 8192 |
| MT EIRP: | −23 dBW |
| CDMA Channel Loading: | 32 MTs |
| Frequency Reuse Factor: | 3 |

To simplify the analysis, zero Doppler shift of the MT's received carrier is assumed (although an arbitrary constant phase shift is applied).

The number of time segments K that are summed to form the output vector $z_k$ as shown in FIG. 4 is treated as the variable in this analysis. Missed-detection and false-detection probabilities as a function of K are determined, where these two probabilities are defined as follows:

Pr{Missed}=conditional probability that a given $z_k(n)$ value does not exceed the decision threshold, given that a R-ACH preamble was received whose PN-offset corresponds to index 12. The mathematical expression for Pr{Missed} is given in equation (43).

$\mathscr{P}$ {False}=conditional probability that one or more $z_k(n)$ values within a given vector $z_k$ exceeds the decision threshold, given that no R-ACH preamble was received. The mathematical expression for $\mathscr{P}$ {False} is given in equation (45).

Given the parameter values in Table 2, the missed-detection and false-detection probabilities defined above were calculated using standard equations for the chi-squared and non-central chi-squared distributions. The results are shown in FIG. 7 as a function of the number of summed time segments K.

FIG. 7 shows that at K=14, both missed-detection and false-detection probabilities have fallen to $1 \times 10^{-6}$. Assuming a time segment duration of 1.2 msec., the total observation time would then be 14×1.2=16.8 msec. Thus, these exemplary analytical results indicate that the R-ACH preamble can be detected with high probability under within the time span of a single 20 msec preamble frame.

Figure 8:
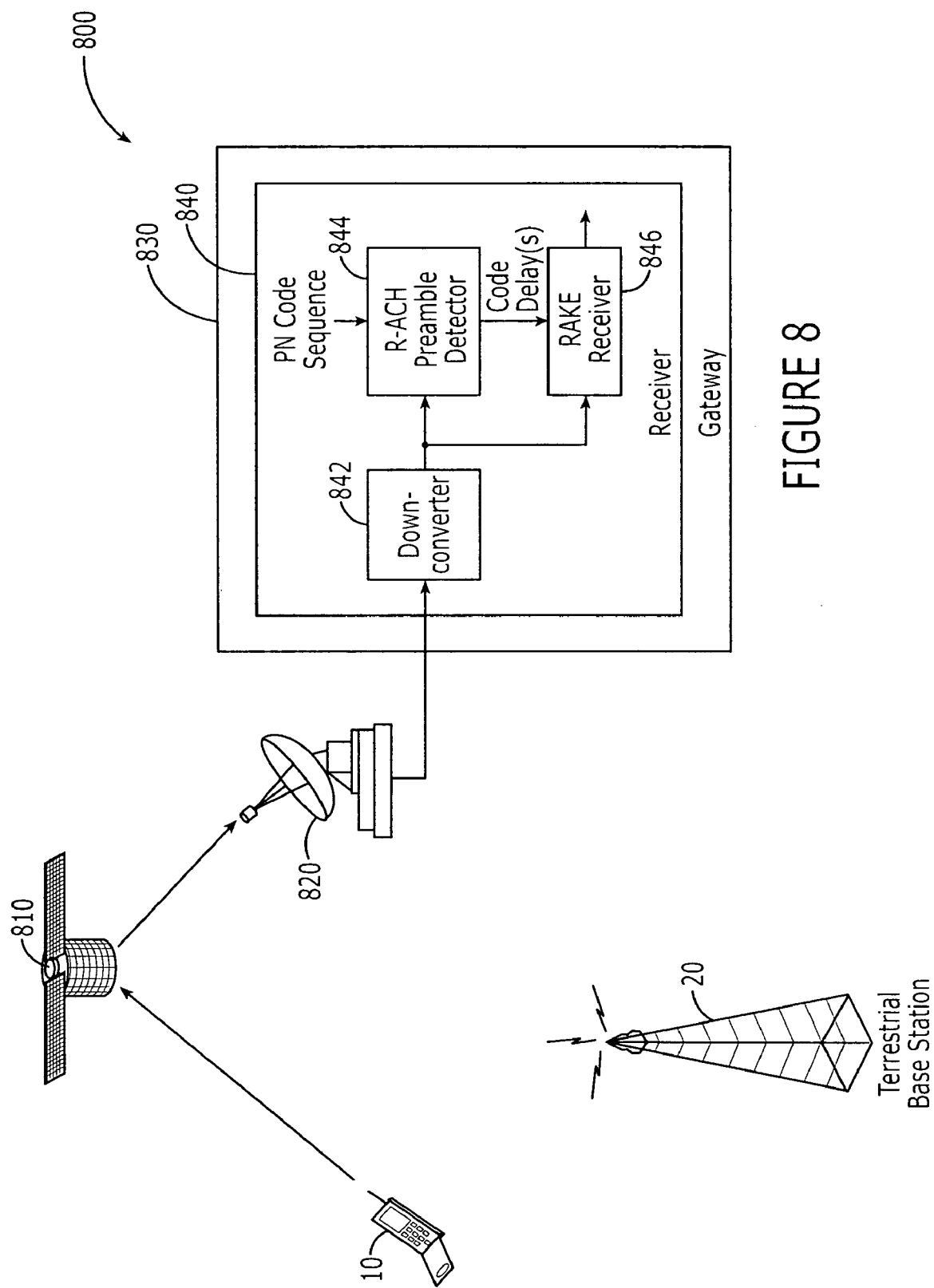
FIGS. 8 and 9 are schematic diagrams of satellite wireless communications systems according to further embodiments of the present invention.

FIG. 8 illustrates a satellite wireless communications system 800 according to some embodiments of the present invention. The system 800 includes a satellite 810 configured to communicate with a wireless terminal 10. The satellite 810 relays transmissions from the terminal 10 to a ground-based antenna 820 associated with a receiver 840 of a gateway 830. As shown, the receiver 840 includes a downconverter 842 that converts radio signals received via the antenna 820 to baseband signals. A R-ACH preamble detector 844 detects a preamble of a R-ACH transmission by the terminal 10 using, for example, the detection techniques discussed above. As shown, the R-ACH transmission from the terminal 10 may be compatible with R-ACH transmission formats (such as IS-95, CDMA2000, or similar) recognized by a terrestrial wireless infrastructure, e.g., the R-ACH message may be encoded according to a spreading code format compatible with the CDMA standards implemented by terrestrial cellular base stations 20. The R-ACH preamble detector 844 is configured to provide an appropriate code delay to a RAKE receiver 846 responsive to detection of a R-ACH preamble, such that operation of the receiver 840 is synchronized to the terminal 10. It will be appreciated that the RAKE receiver 846 may include, for example, a combination of correlator fingers, one or more combiners for combining the outputs of the correlator fingers, and a symbol estimator that generates estimates of information in a received spread spectrum signal. Operations and configurations of RAKE receivers are known to those skilled in the art, and will not be discussed in greater detail herein. It will also be appreciated that CDMA receivers other than RAKE receivers may be used.

Figure 9:
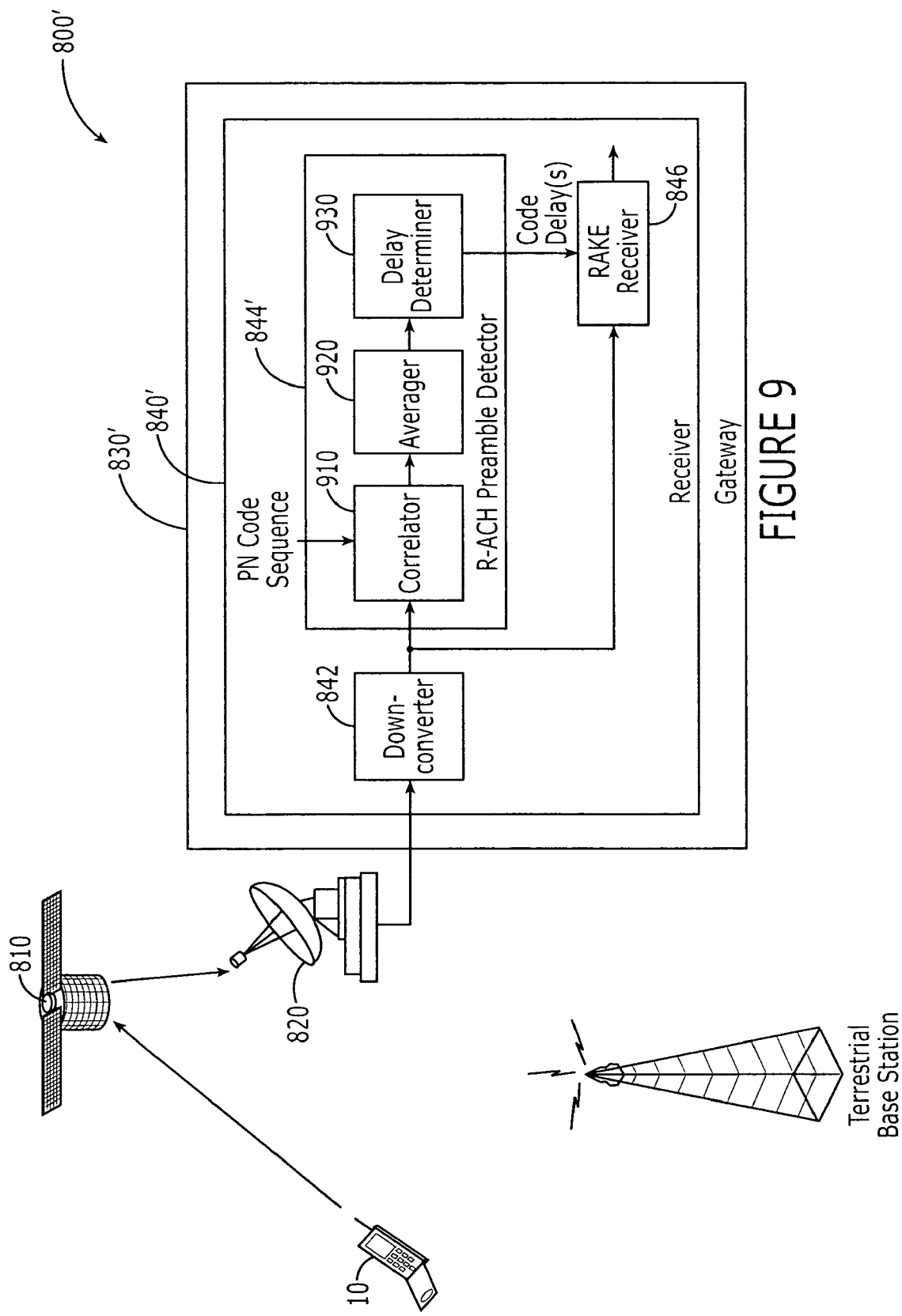

As illustrated in FIG. 9, a mobile satellite communications system 800' according to further embodiments of the present invention may include a gateway 830' with a receiver 840' including a R-ACH preamble detector 844' including a correlator 910, an averager 920, and a delay determiner 930. The correlator 910 may provide functions similar to those of the FFT correlator 410 and magnitude-squared converter 420 of FIG. 4, and the averager 920 may perform functions similar to those of the averager 410 of FIG. 4. The delay determiner 930 may perform functions similar to those described for the delay determiner 610 of FIG. 6.

It will be appreciated that the implementations shown in FIGS. 8 and 9 are exemplary, and that other implementations fall within the scope of the present invention. For example, although FIGS. 8 and 9 show implementation of R-ACH preamble detection in a satellite gateway, it will be understood that such functions may be implemented in other system components, e.g., in a satellite or some other component of a satellite wireless communications system. It will be further understood that, although exemplary embodiments described above relate to determining signal timing by detecting a known information element in the form of a R-ACH preamble, similar timing determination could be achieved within the scope of the invention by detecting other known information elements in terminal transmissions.

CDMA deployment over satellite generally requires that the system accommodate the longer path delay and increased delay variability of the satellite channel. According to some embodiments of the invention, a satellite gateway receiver is synchronized to mobile terminal (MT) transmissions on the return link using a correlation process at the gateway to detect the preamble of the MT's Reverse Access Channel (R-ACH) transmission during call setup. By measuring the time offset of the preamble's spreading PN-sequence, the precise path delay from the gateway to the MT can be determined. This time offset can be used to adjust the initial timing of the RAKE receiver's de-spreading sequence, which can greatly reduce the code phase search range to synchronize and de-spread the MT's signal.

In the drawings and specification, there have been disclosed exemplary embodiments of the invention. Although specific terms are employed, they are used in a generic and descriptive sense only and not for purposes of limitation, the scope of the invention being defined by the following claims.

What is claimed is:

1. A method of synchronizing a satellite wireless communications system with a terminal, the method comprising:
   receiving an uplink signal transmitted by the terminal, the uplink signal including a known information element spread according to a spreading code specific to a component of a satellite wireless communications system;
   determining a correlation of the received uplink signal with the spreading code over a range of time shifts, wherein determining a correlation of the received uplink signal with the spreading code over a range of time shifts comprises:
      generating respective sets of correlation measures for respective ones of a plurality of time segments, the sets of correlation measures including respective correlation measures for respective time shifts of the range of time shifts; and
      averaging the correlation measures for the respective time shifts over the plurality of sets of correlation measures to generate a set of average correlation measures; and
   detecting the known information element from the determined correlation, wherein detecting the known information element from the determined correlation comprises detecting a peak value in the set of average correlation measures; and
      synchronizing the satellite wireless communications system with the terminal responsive to detection of the known information element.

2. A method according to claim 1, wherein the spreading code comprises a pseudonoise (PN) sequence associated with a satellite beam.

3. A method according to claim 1, wherein the known information element comprises a fixed value data sequence.

4. A method according to claim 1, wherein the uplink signal comprises a reverse access channel (R-ACH) message, and wherein the known information element comprises a preamble of the R-ACH message.

5. A method according to claim 1:
   wherein generating respective sets of correlation measures for respective ones of a plurality of time segments comprises:
      correlating respective sets of samples of the received uplink signal for the respective time segments with multiple time shifts of the spreading code to generate respective sets of correlation values; and
      generating respective sets of magnitude measures for the respective time segments from the respective sets of correlation values; and
   wherein averaging the correlation measures for the respective time shifts over the plurality of sets of correlation measures comprises averaging the magnitude measures for the respective time shifts over the sets of magnitude measures to generate the set of average correlation measures.

6. A method according to claim 5, wherein correlating respective sets of samples of the received uplink signal for the respective time segments with multiple time shifts of the spreading code to generate respective sets of correlation values comprises fast Fourier transform (FFT) correlating the respective sets of samples with the spreading code to generate the respective sets of correlation values.

7. A method according to claim 1, wherein synchronizing the satellite wireless communications system with the terminal responsive to detection of the known information element comprises assigning a delay to a receiver of the satellite wireless communications system responsive to detection of the known information element.

8. A method of synchronizing a satellite wireless communications system with a terminal, the method comprising:
   receiving a radio signal at the satellite wireless communications system;
   detecting a preamble of a transmitted R-ACH message in the received radio signal, wherein detecting a preamble of a transmitted R-ACH message comprises:
      determining a correlation of the received radio signal with a PN sequence; and
      detecting the preamble of a transmitted R-ACH message from the determined correlation; and
   synchronizing the satellite wireless communications system with a terminal that transmitted the R-ACH message responsive to detection of the preamble of the R-ACH message;
   wherein determining a correlation of the received radio signal with a PN sequence comprises determining a correlation of the received radio signal with the PN sequence over a range of time shifts;
   wherein determining a correlation of the received radio signal with the PN sequence over a range of time shifts comprises:
      generating respective sets of correlation measures for respective ones of a plurality of time segments, the sets of correlation measures including respective correlation measures for respective time shifts of the range of time shifts; and
      averaging the correlation measures for the respective time shifts over the plurality of sets of correlation measures to generate a set of average correlation measures; and
   wherein detecting a preamble of a R-ACH message comprises detecting a peak value in the set of average correlation measures.

9. A method according to claim 8, wherein the PN sequence comprises a PN sequence associated with a satellite beam.

10. A method according to claim 8:
   wherein generating respective sets of correlation measures for respective ones of a plurality of time segments comprises:
      correlating respective sets of samples of the received radio signal for the respective time segments with multiple time shifts of the PN sequence to generate respective sets of correlation values; and
      generating respective sets of magnitude measures for the respective time segments from the respective sets of correlation values; and
   wherein averaging the correlation measures for the respective time shifts over the plurality of sets of correlation measures comprises averaging the magnitude measures for the respective time shifts over the sets of magnitude measures to generate the set of average correlation measures.

11. A method according to claim 10, wherein correlating respective sets of samples of the received radio signal for the respective time segments with multiple time shifts of the PN sequence to generate respective sets of correlation values fast Fourier transform (FFT) correlating the respective sets of samples with the PN code to generate the respective sets of correlation values.

12. A method according to claim 8, wherein synchronizing the satellite wireless communications system with a terminal that transmitted the R-ACH message responsive to detection of the preamble of the R-ACH message comprises assigning a delay to a receiver of the satellite wireless communications system responsive to detection of the known information element.

13. A method according to claim 8, wherein receiving a radio signal at the satellite wireless communications system comprises receiving the radio signal at a satellite gateway.

14. An apparatus for synchronizing a satellite wireless communications system with a terminal that transmits an uplink signal including a known information element spread according to a spreading code specific to a component of a satellite wireless communications system, the apparatus comprising:
a receiver configured to receive the uplink signal transmitted by the terminal, to determine a correlation of the received uplink signal with the spreading code over a range of time shifts, to detect the known information element from the determined correlation and to synchronize with the terminal responsive to detection of the known information element, wherein the receiver comprises:
means for generating respective sets of correlation measures for respective ones of a plurality of time segments, the sets of correlation measures including respective correlation measures for respective time shifts of the range of time shifts;
means for averaging the correlation measures for the respective time shifts over the plurality of sets of correlation measures to generate a set of average correlation measures; and
means for detecting a peak value in the set of average correlation measures.

15. An apparatus according to claim 14, wherein the spreading code comprises a PN sequence associated with a satellite beam.

16. An apparatus according to claim 14, wherein the known information element comprises a fixed value data sequence.

17. An apparatus according to claim 14, wherein the uplink signal comprises a R-ACH message, and wherein the known information element comprises a preamble of the R-ACH message.

18. An apparatus according to claim 14:
wherein the means for generating respective sets of correlation measures for respective ones of a plurality of time segments comprises:
means for correlating respective sets of samples of the received uplink signal for the respective time segments with multiple time shifts of the spreading code to generate respective sets of correlation values; and
means for generating respective sets of magnitude measures for the respective time segments from the respective sets of correlation values; and
wherein the means for averaging the correlation measures for the respective time shifts over the plurality of sets of correlation measures to generate a set of average correlation measures comprises means for averaging the magnitude measures for the respective time shifts over the sets of magnitude measures to generate the set of average correlation measures.

19. An apparatus according to claim 18, wherein the means for correlating respective sets of samples of the received uplink signal for the respective time segments with multiple time shifts of the spreading code to generate respective sets of correlation values comprises a fast Fourier transform (FFT) correlator configured to correlate the respective sets of samples with the spreading code to generate the respective sets of correlation values.

20. An apparatus according to claim 14, wherein the receiver further comprises:
a receiver configured to estimate information included in the uplink signal; and
a delay determiner configured to assign a delay to the receiver responsive to detection of the known information element.

21. An apparatus for synchronizing a satellite wireless communications system with a terminal, the apparatus comprising:
a receiver configured to receive a radio signal at the satellite wireless communications system, to detect a preamble of a R-ACH message transmitted by a terminal and to synchronize with the terminal responsive to detection of the preamble of the R-ACH message, wherein the receiver is configured to determine a correlation of the received radio signal with a PN sequence, and to detect the preamble of the transmitted R-ACH message from the determined correlation, wherein the receiver is configured to determine a correlation of the received radio signal with the PN sequence over a range of time shifts, wherein the receiver comprises:
means for generating respective sets of correlation measures for respective ones of a plurality of time segments, the sets of correlation measures including respective correlation measures for respective time shifts of the range of time shifts;
means for averaging the correlation measures for the respective time shifts over the plurality of sets of correlation measures to generate a set of average correlation measures; and
means for detecting a peak value in the set of average correlation measures,
wherein the means for generating respective sets of correlation measures for respective ones of a plurality of time segments comprises:
means for correlating respective sets of samples of the received radio signal for the respective time segments with multiple time shifts of the PN sequence to generate respective sets of correlation values; and
means for generating respective sets of magnitude measures for the respective time segments from the respective sets of correlation values; and
wherein the means for averaging the correlation measures for the respective time shifts over the plurality of sets of correlation measures comprises means for averaging the magnitude measures for the respective time shifts over the sets of magnitude measures to generate the set of average correlation measures.

22. An apparatus according to claim 21, wherein the PN sequence comprises a PN sequence associated with a satellite beam.

23. An apparatus according to claim 21, wherein the receiver further comprises:
a receiver configured to estimate information included in the radio signal; and
a delay determiner configured to assign a delay to the receiver responsive to detection of the R-ACH preamble.

24. An apparatus according to claim 21, wherein the receiver is positioned at a satellite gateway.

* * * * *